A. C. REE.
SHOCK ABSORBER.
APPLICATION FILED JULY 11, 1921.
1,434,024. Patented Oct. 31, 1922.
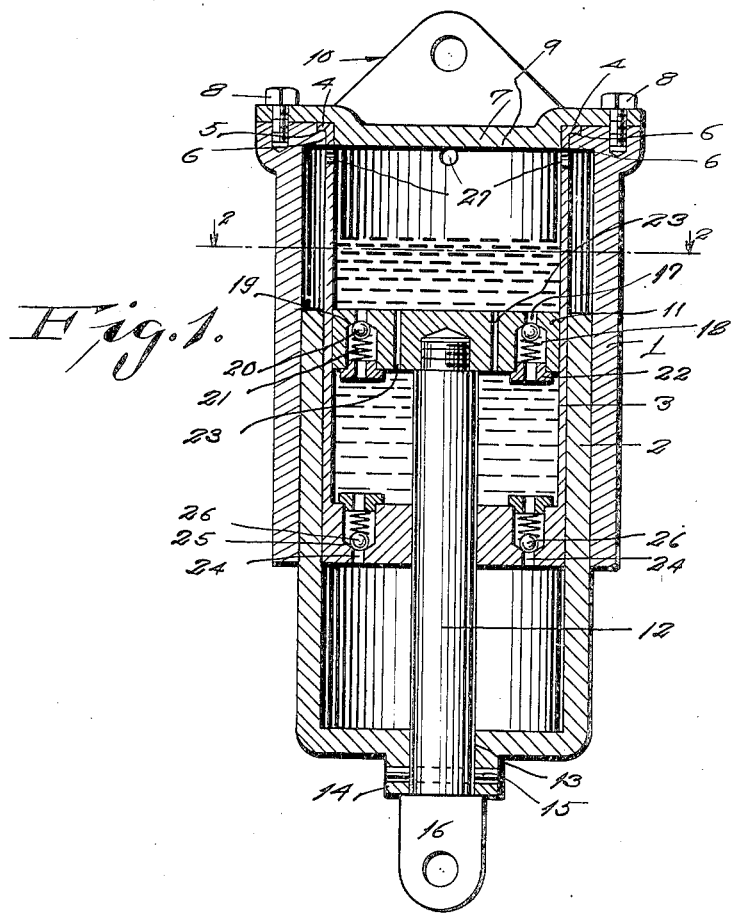
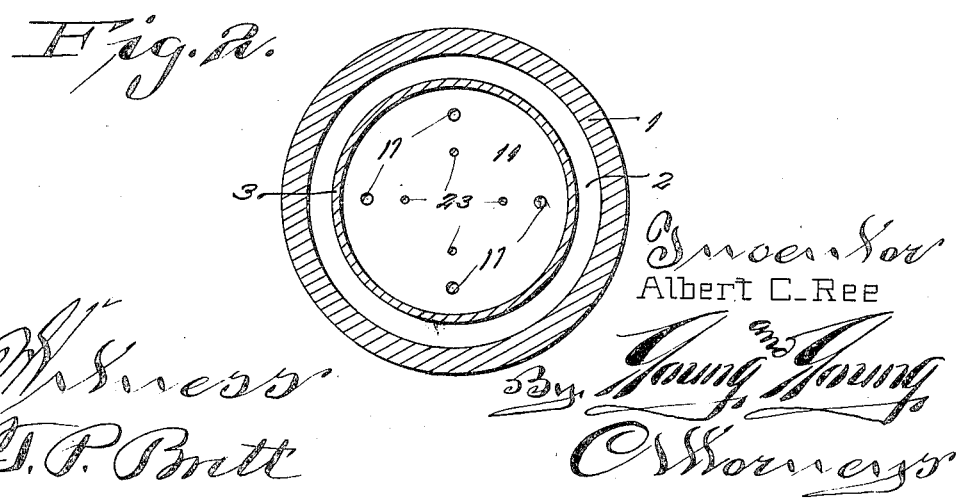
Inventor
Albert C. Ree Patented Oct. 31, 1922.

1,434,024

UNITED STATES PATENT OFFICE.

ALBERT C. REE, OF LIBERTYVILLE, ILLINOIS.

SHOCK ABSORBER.

Application filed July 11, 1921. Serial No. 483,892.

*To all whom it may concern:*

Be it known that I, ALBERT C. REE, a citizen of the United States, and resident of Libertyville, in the county of Lake and State of Illinois, have invented certain new and useful Improvements in Shock Absorbers; and I do hereby declare that the following is a full, clear, and exact description thereof.

My invention relates generally to shock absorbers, and more particularly to that type embodying a liquid for shock absorbing purposes.

The primary aim and object of my invention contemplates the provision of a device of the above mentioned character with a view of eliminating the necessity of packing and wherein the construction is improved so as to effectively accomplish this object.

Other objects as well as the nature, characteristic features and scope of my invention will be more readily understood from the following description taken in connection with the accompanying drawings and pointed out in the claims forming a part of this specification.

The invention is clearly illustrated in the accompanying drawings, in which:—

Figure 1 is a vertical sectional view of my improved shock absorber, and

Figure 2 is a horizontal section on the line 2—2 of Figure 1.

Similar characters of reference are employed throughout the several views to designate corresponding parts.

Referring to the drawings in detail, the numeral 1 designates an outer or upper section, preferably in the form of a cylinder in which is slidably arranged the lower cylindrical section 2. Supported within the outer cylindrical section 1 is a secondary cylindrical section or sleeeve 3, the supporting means therefor being preferably accomplished by the countersinking engagement of the exteriorly annularly flanged upper end 4 on the seat 5 of an inturned annular flange 6 integral with the upper end of the outer cylindrical section 1. As will be noted the sections 1 and 3 form in effect a double walled cylinder. The inner cylindrical sleeve 3 is detachably yet firmly retained in position by an attaching cover 7, the latter being held in place by suitable securing means such as screw bolts 8. Referring to Figure 1, it will be noted that the cover 7 has made integral therewith a depending boss 9 concentrical of the cover which is adapted to fit within the sleeve 3 and serve to facilitate the anchoring of the sleeve.

The cover 7 has made integral thereon an apertured upright 10 adapted to receive fastening means for securing the upper or outer section of the shock absorber in place.

The lower end of the sleeve 3 is closed to form a liquid chamber while working within the inner section or sleeve 3 is a piston head 11 the rod 12 of which is slidable through the central opening in the bottom of the sleeve 3. This rod is also arranged through an opening 13 provided in the lower end of the section 2. The opening 13 has formed thereabout a boss 14 through which suitable fastening means, such as a pin 15, is inserted and the pin also traverses the rod so as to firmly hold the rod to the lower section 2, and also maintain the outer end surface of the piston head 11 in alignment with the upper edge of the lower section 2. The free end of the rod is enlarged and apertured, as indicated at 16, and is adapted to be secured to the other part of the device (not shown) to which the shock absorber is to be applied.

With a view toward providing suitable means for controlling the passage of the liquid by the piston head during the latter's movement through the inner sleeve or section, I have provided within the piston head a plurality of vertical passages 17, the lower portions of which are enlarged, as at 18, to form seats 19 for suitable valves 20, the latter being held in place by springs 21, the free end of which abuts against a nut 22, by which the tension of the springs may be regulated.

In addition, the piston head is provided with a plurality of unobstructed passages 23 through which the liquid passes for a purpose hereinafter to be described.

The bottom of the sleeve or cylindrical section 3 is likewise formed with a vertical passage or passages 24, the upper ends or portions of which are enlarged to form valve seats 25, for coacting valves 26 of a type similar to those employed in the piston head. To allow for the passage of air from the upper end of the sleeve or section 3, openings 27 are provided.

The mode of operation of my invention may be briefly stated as follows:—

Assuming that the parts have been assembled in the manner described, when the machine or device (not shown) to which the shock absorber is to be applied is subjected to a shock, the sections 1 and 2 move toward each other, while the piston head 11 works upwardly in the liquid, such as oil, retained in the chamber formed by the sleeve 3, the valves 20 being forced from their seats 19 for the flow of oil through the passages 17 and 23, thus permitting the upward movement of the piston head and at the same time serving to absorb the initial shock. During this movement the valves 26 are also opened to permit the passage of air from the space between the bottom of the chamber and the bottom of the inner or lower section. On the rebound, the valves 20 and 26 are closed, the liquid passing only through the passages 23, this action absorbing the "secondary shock."

From the foregoing, it will be apparent that I have shown and described one specific form of my invention, but it is to be understood that I do not limit myself to the precise details of construction, as modifications and variations may be made therein without departing from the spirit of the invention.

Having thus fully described my invention, what I claim as new, and desire to secure by Letters Patent, is:—

1. A shock absorber of the character described including a double walled section having the inner portion closed to form a liquid receiving chamber, a second section slidable longitudinally between the double walled section, and a valved piston carried with the last mentioned section and operating within the chamber.

2. A shock absorber of the character described including a pair of relatively movable sections one of which is double walled to provide a liquid receiving chamber, while the other section is slidable between the double walled section, an attaching cover detachably secured to the outer end of the double walled section, and a valved attaching piston carried by the last mentioned section and operating within the chamber.

3. A shock absorber of the character described comprising a pair of telescoping cylindrical sections, one of which is closed at its lower end, a sleeve suspended within the outer section and provided with a bottom, vent openings adjacent its upper end, a cover detachably secured to the upper end of said section and serving as anchoring means for said sleeve, attaching means carried by the cover, a piston rod projecting through the closed end of the lower section and movable through the bottom of the chamber, an apertured valved head on the rod operating in the liquid chamber, check valves mounted in the bottom of the chamber, and an attaching enlargement on the outer end of the rod.

4. A shock absorber of the class described comprising a pair of telescoping cylindrical sections, a sleeve secured to one section and fitting within the other, openings adjacent its attaching end and in its bottom, and a valved piston carried by the second section and operating within said sleeve.

In testimony that I claim the foregoing I have hereunto set my hand at Libertyville, in the county of Lake and State of Illinois.

ALBERT C. REE.